(12) United States Patent
Ramanujam

(10) Patent No.: US 8,682,918 B2
(45) Date of Patent: Mar. 25, 2014

(54) METHOD AND SYSTEM FOR MAKING CONTENT-BASED RECOMMENDATIONS

(75) Inventor: Srivatsan Ramanujam, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 1 day.

(21) Appl. No.: 13/042,658

(22) Filed: Mar. 8, 2011

(65) Prior Publication Data

US 2012/0233191 A1 Sep. 13, 2012

Related U.S. Application Data

(60) Provisional application No. 61/416,194, filed on Nov. 22, 2010.

(51) Int. Cl.
*G06F 17/00* (2006.01)

(52) U.S. Cl.
USPC ............................................. 707/758; 707/737

(58) Field of Classification Search
USPC ................................................. 707/758, 737
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |

(Continued)

OTHER PUBLICATIONS

David M. Blie et al., "Latent Dirichlet Allocation", Journal of Machine Learning Research 3, Published Jan. 2003, pp. 993-1022.

(Continued)

*Primary Examiner* — Belix M Ortiz Ditren
(74) *Attorney, Agent, or Firm* — Dergosits & Noah LLP; Todd A. Noah

(57) ABSTRACT

An entity is provided a recommendation based on content associated with the entity. The entity may be a user or a group. The recommendation may be one or more other users, groups, or other data objects having associated content that is similar to the content that is associated with the entity.

20 Claims, 7 Drawing Sheets

(56) References Cited

U.S. PATENT DOCUMENTS

| | | |
|---|---|---|
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson |
| 7,698,160 B2 | 4/2010 | Beaven et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 8,386,240 B2 * | 2/2013 | Wu et al. .................. 704/10 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2012/0166438 A1 * | 6/2012 | Wu et al. .................. 707/737 |

OTHER PUBLICATIONS

Mark Steyvers et al., "Probabilistic Topic Models", Latent Semantic Analysis: A Road to Meaning by Lawrence Erlbaum Associates (2007), pp. 1-15.

* cited by examiner

METHOD AND SYSTEM FOR MAKING CONTENT-BASED RECOMMENDATIONS

CLAIM OF PRIORITY

This application claims the benefit of U.S. Provisional Patent Application 61/416,194 entitled PROBABILISTIC TOPIC MODEL FOR FEED RECOMMENDATION AND SEARCH AUGMENTATION, by Srivatsan Ramanujam, filed Nov. 22, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to information networks in an on-demand services environment, database network system, computing environment, or combinations of these.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Humans are social beings. Humans form groups to exchange ideas, share and pool resources, find support from and interact with like-minded people, and so forth. The rise of information networks such as the Internet has facilitated the ability for people to connect and organize with others for many different and diverse purposes. Some examples include business, social, political, and academic purposes, and many others. There are groups discussing everything from military encryption to freshwater fossils. Typically, what a group has in common is some shared interest among the members.

It is, however, difficult and time-consuming to sort through the vast trove of information that is available on an information network in order to find things of interest. For example, companies are increasingly global where employees are now located in many different countries and cities. With such a diverse work force, it can be difficult for a user, such as an employee to find resources such as other employees, groups, documents, reports, findings, presentations, and so forth which may be of interest.

Accordingly, it is desirable to provide new and improved techniques to provide things that may be of interest to a user or a group of users.

BRIEF SUMMARY

An entity is provided a recommendation based on content associated with the entity. The entity may be a user or a group. The recommendation may be one or more other users, groups, or other data objects having associated content that is similar to the content that is associated with the entity. In accordance with embodiments, there are provided mechanisms and methods for making content-based recommendations. These mechanisms and methods for making content-based recommendations can enable embodiments to provide relevant objects to the user or group based on content associated with the user or group and object. The ability of embodiments to provide content-based recommendations can enable the user or group to find other users, groups, or objects having similar interests as the user or group. In a specific implementation, a technique includes the application of the Latent Dirichlet Allocation model for feed recommendations (and recommendations for entities such as report objects, dashboard objects, account objects, and so forth) in a corporate social network using "social content." Some examples of social content include comments, status updates, posts, file uploads, chatters, "likes," and so forth) that may be available on a social network.

In an embodiment and by way of example, a method includes calculating a plurality of topic distributions of content associated with a plurality of entities, comparing a first topic distribution based on content associated with a first entity with a second topic distribution based on content associated with a second entity to determine a first divergence between the first topic distribution and the second topic distribution, comparing the first topic distribution with a third topic distribution based on content associated with a third entity to determine a second divergence between the first topic distribution and the third topic distribution. If the first divergence is less than the second divergence, the method includes displaying an indication of the second entity on a webpage profile of the first entity to permit the first entity to follow the second entity. If the second divergence is less than the first divergence, the method includes displaying an indication of the third entity on the webpage profile of the first entity to permit the first entity to follow the third entity.

In an embodiment and by way of example, a method for making content-based recommendations is provided. The method embodiment includes determining a relevant newsfeed for a first entity including calculating a topic distribution for a newsfeed published by the first entity, comparing the topic distribution with a database of one or more topic distributions to identify a relevant topic distribution, the relevant topic distribution associated with a second entity, and, providing the second entity to the first entity.

While one or more implementations and techniques are described with reference to an embodiment in which making content-based recommendations is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are provided for making recommendations based on content. As used herein, content can be any information created, authored, generated, adopted, uploaded, associated with, or published by an entity. An entity may be a user, group, or other data object.

Figure 1:
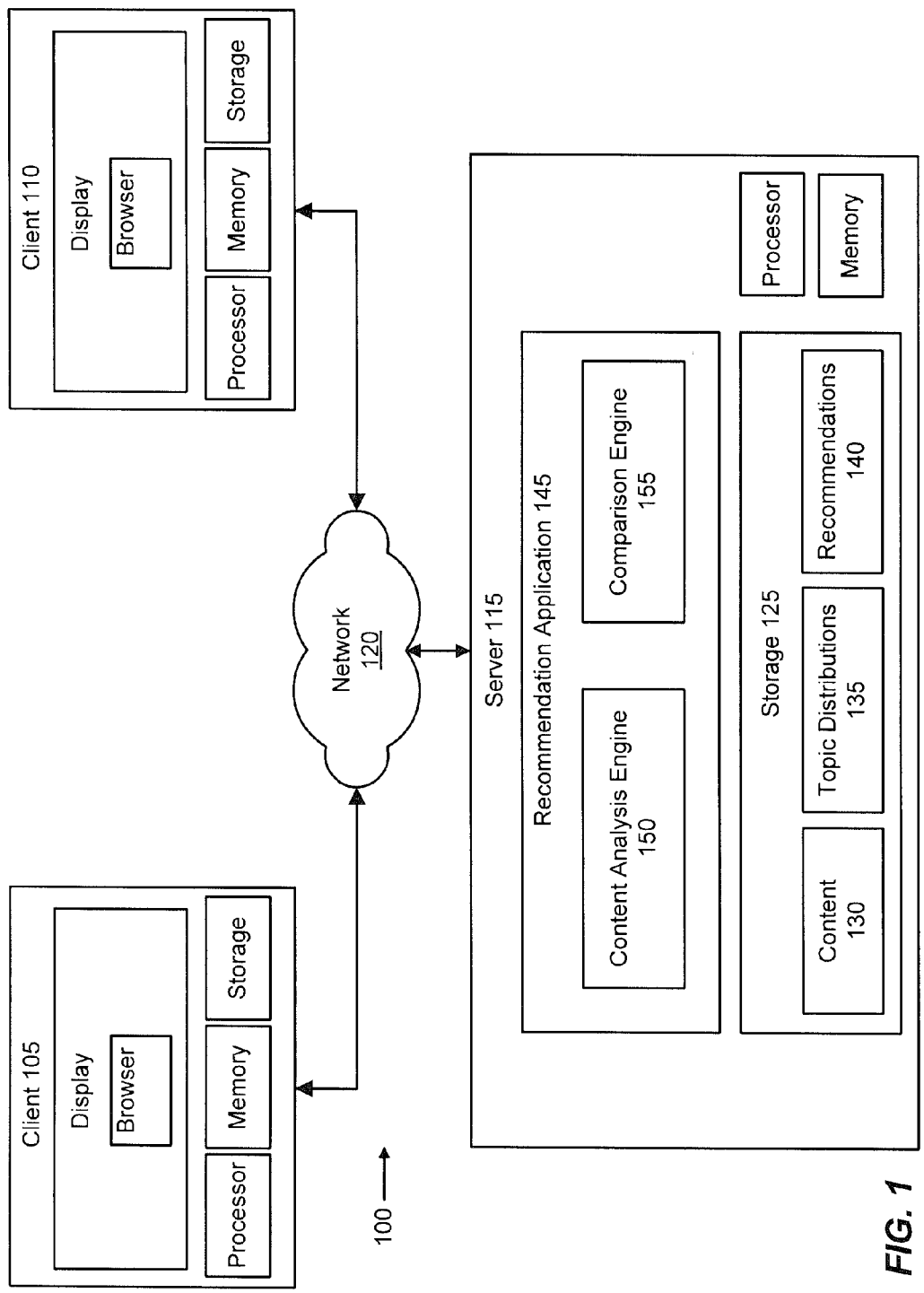
FIG. 1 illustrates a representative system for making content-based recommendations in an embodiment.
Figure 6:
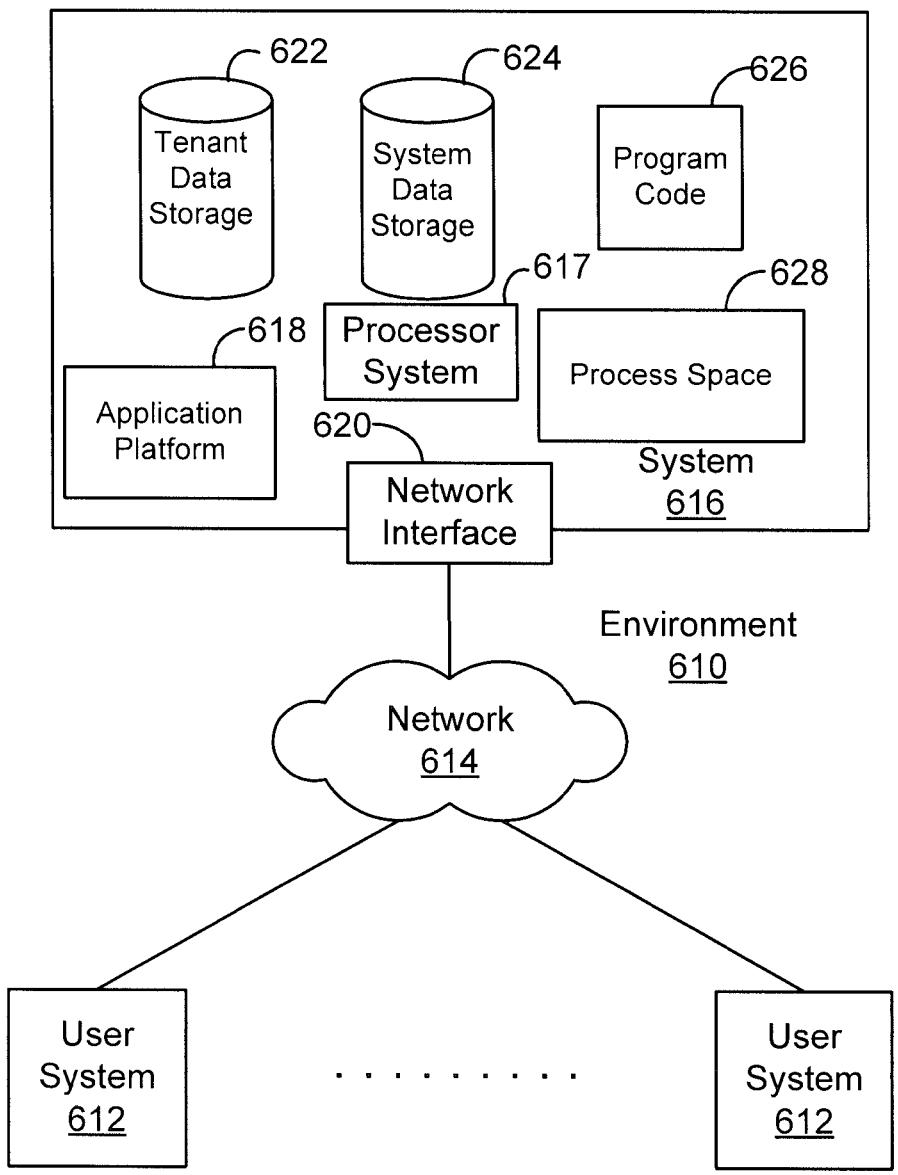
FIG. 6 illustrates a block diagram of an example of an environment wherein an on-demand database service implementing an embodiment of a content-based recommendation system might be used.
Figure 7:
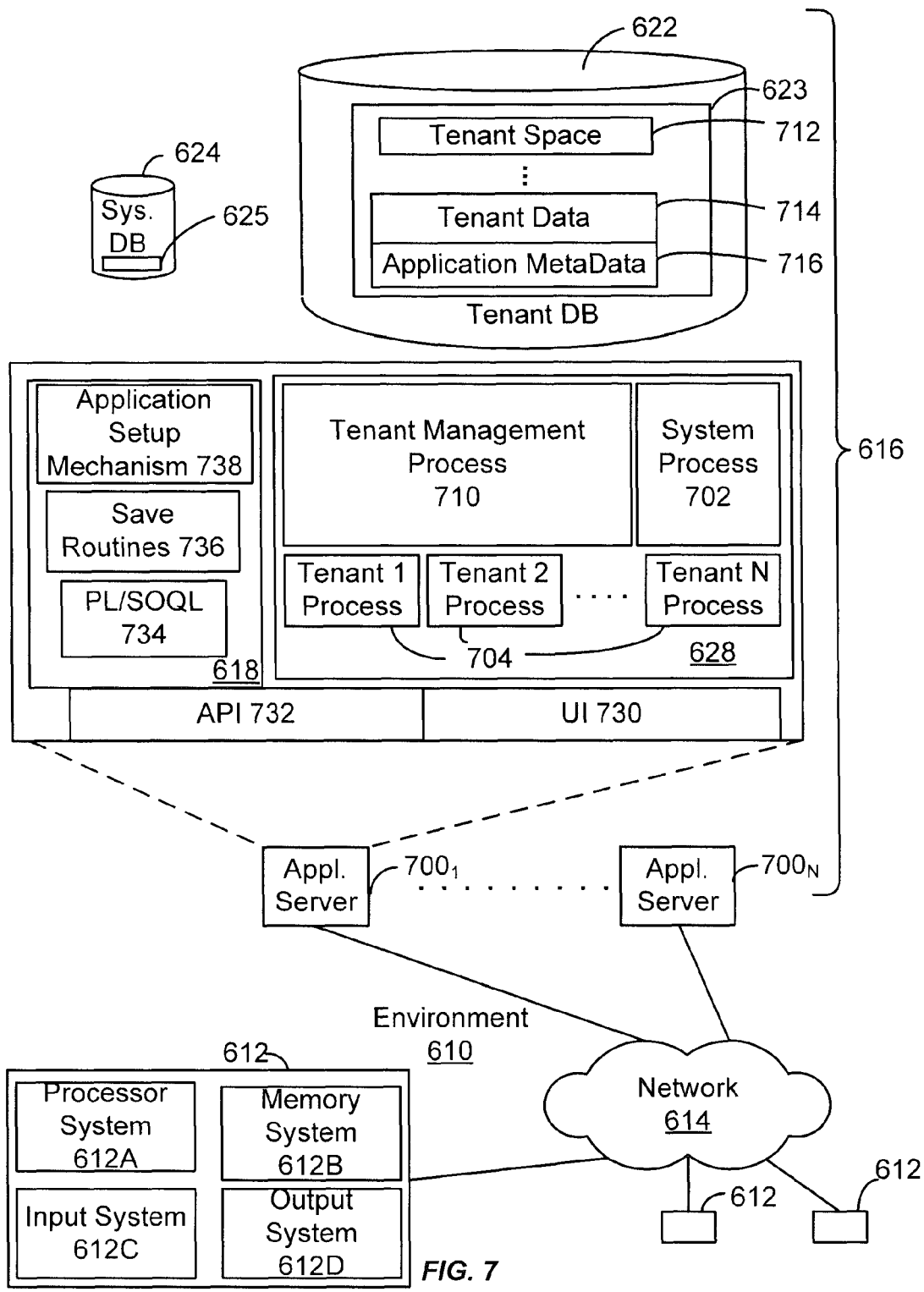
FIG. 7 illustrates a block diagram of an embodiment of elements of FIG. 6 and various possible interconnections between these elements.

FIG. 1 shows a block diagram of a specific embodiment of a representative system 100 for making recommendations based on content. This system includes any number of clients such as first and second clients 105 and 110, respectively, which access a server 115 via a network 120. The network is as shown in FIGS. 6-7 and described below.

The clients and server are computers with hardware and software, such as a shown in FIGS. 6-7 and described below. For example, each of the first and second clients can include a display, application program (e.g., browser application program), processor, memory and storage. The browser is an application program that can request, receive, and process data from a user, the server, or both. The data can be shown via the display at the client.

The server includes components similar to the components shown in FIGS. 6-7 and described below. For example, the server includes a processor, memory, applications, and storage 125. In a specific implementation, the storage includes content or user-generated content 130, topic distributions 135, and recommendations 140. In this specific implementation, the applications include a content-based recommendation application or system 145. The recommendation application includes a content analysis engine or module 150 and a comparison engine 155.

The content analysis engine analyzes the user-generated content in order to provide recommendations to a first entity such as a user or a group. The recommendation can be a second entity or multiple entities, such as one or more other users, groups, or other data objects that the system determines the first entity may be interested in based on the similarities between the content associated with the first entity and the content associated with the second entity, i.e., the other users, groups, or objects.

Traditional recommendation systems rely on a network of shared connections among users in order to recommend one user to another user. Some users, however, such as new users, may not have many connections which can be leveraged by traditional systems to provide the new user with recommendations of other users. Other traditional systems require the user to take proactive steps such as requiring the user to check a specific set of attributes or interests which the system then attempts to match in order to make a recommendation. Users, however, may be reluctant to make such a dedicated effort. Further, the check list of interests may not reflect the many different and diverse interests a person can have. A feature of the invention includes making recommendations based on user-content. For example, the system can recommend to user A, a user B based on similarities between the content published by users A and B, even if user A and B do not share any direct or indirect connections. The system can be passive such that users are not directly responding to a specific set of attributes or questions about their interests. The system can make good recommendations because the system can capture the many diverse interests a user can have and recommend to that user, another user who shares one or more similar interests.

Further, the system is generic and can make a recommendation of any entity to any entity. For example, the system can make a recommendation of a group to another group based on similarities between the content associated with the groups. The system can make a recommendation of a group to a user based on similarities between the content associated with the group and user. Thus, the entities can be of different types. The system can make multiple recommendations. For example, the system can make a recommendation of multiple (or a list of) groups, users, or both to a user. When multiple recommendations are made, the system can rank or order the recommendations in terms of their relevance.

Further, the entity receiving the recommendation does not necessarily have to be a user or a group and may instead be, for example, a file, or other data object, although the consumer of the recommendation is one or more users. As an example, a first entity A may be a dashboard object indicating the sales by all sales executives in each region (e.g., East, West, North, and South). A second entity B may be "Leads by Sales Executive by region"—another dashboard object, which the system found to be closest to first entity A. In this example, the amount of sales is expected to have a direct correlation to the number of leads generated. It should be appreciated that in this example, the dashboard objects may instead be report objects. As another example, a company may use an internal application to keep track of all patent applications filed by their employees. In this example, first entity A, could be a patent application and second entity B could be another patent application. As another example, first entity A could be an account or a contact object, and second entity B could be another account or contact object. In this example, an account object is a collection of fields describing a client. And, a contact object is a collection of fields describing a customer's contact information. As another example, first entity A and second entity B may be opportunity objects, such as two sales opportunities.

A specific implementation of this invention is for a business collaboration or corporate social network known as Chatter®, provided by Salesforce.com, Inc. of San Francisco, Calif. Chatter® is a collaboration application and a platform for building collaborative cloud-computing applications. Chatter® provides real-time feeds and updates on people, groups, documents, files, and other business objects such as reports and dashboards. It should be appreciated, however, that the invention can be implemented in any business collaboration network or any kind of network, such as a social network, where it is desirable to provide recommendations based on content. Aspects of the invention may be implemented in connection with advertising, marketing, matchmaking, on-line dating, e-learning, e-commerce, and so forth.

In a specific implementation, the content analysis engine includes algorithms for modeling content or otherwise creating a representation or abstraction of the content. In a specific implementation, the modeling includes a Latent Dirichlet Allocation (LDA) model. LDA is a generative probabilistic model for collections of discrete data such as text corpora.

With the LDA technique, each item or piece of content is modeled as a finite mixture over an underlying distribution of topics. Each topic is, in turn modeled as a distribution over an underlying set of words, such as from a vocabulary. The topic probabilities provide a representation of the content (e.g., document). The calculated topic distributions can be stored in the storage.

The comparison engine includes algorithms for comparing the content modeled by the content analysis engine. More particularly, in a specific implementation, the comparison engine compares a first topic distribution based on content associated with a first entity with, for example, a second topic distribution based on content associated with a second entity to determine a divergence (or difference or distance) between the first and second topic distributions. The divergence provides an indication of the similarity (or dissimilarity) between the first and second topic distributions. In a specific implementation, a Kullback-Leibler (KL) divergence is used to measure the divergence between the first and second topic distributions. Although a specific embodiment of the invention is directed to application of the LDA model and KL divergence to make content-based recommendations, it should be appreciated that other techniques to model or analyze the content may instead or additionally be used to make content-based recommendations.

In this specific implementation, if the divergence is small, i.e., there is a high degree of similarity between the first and second topic distributions, the system provides or recommends the second entity to the first entity. If the divergence is large, i.e., there is a small degree of similarity between the first and second topic distributions, the system may not recommend the second entity to the first entity. Instead, the system may recommend a third entity to the first entity where the topic distribution for content associated with the third entity is more similar to the first topic distribution than the second topic distribution. The recommendations made by the system may be stored in the storage for additional processing and analysis. Further discussion of the LDA model and the KL divergence is provided in FIGS. 4-5, the discussion that accompanies the figures, and in Blei, David M.; Ng, Andrew Y.; Jordan, Michael I (January 2003); "Latent Dirichlet Allocation," Journal of Machine Learning Research 3: pp. 993-1022, and Steyvers, Mark; Griffiths, Tom (2007); "Probabilistic Topic Models," Handbook of Latent Semantic Analysis, Lawrence Erlbaum Associates, which are incorporated by reference along with all other references cited in this application.

Figure 2:
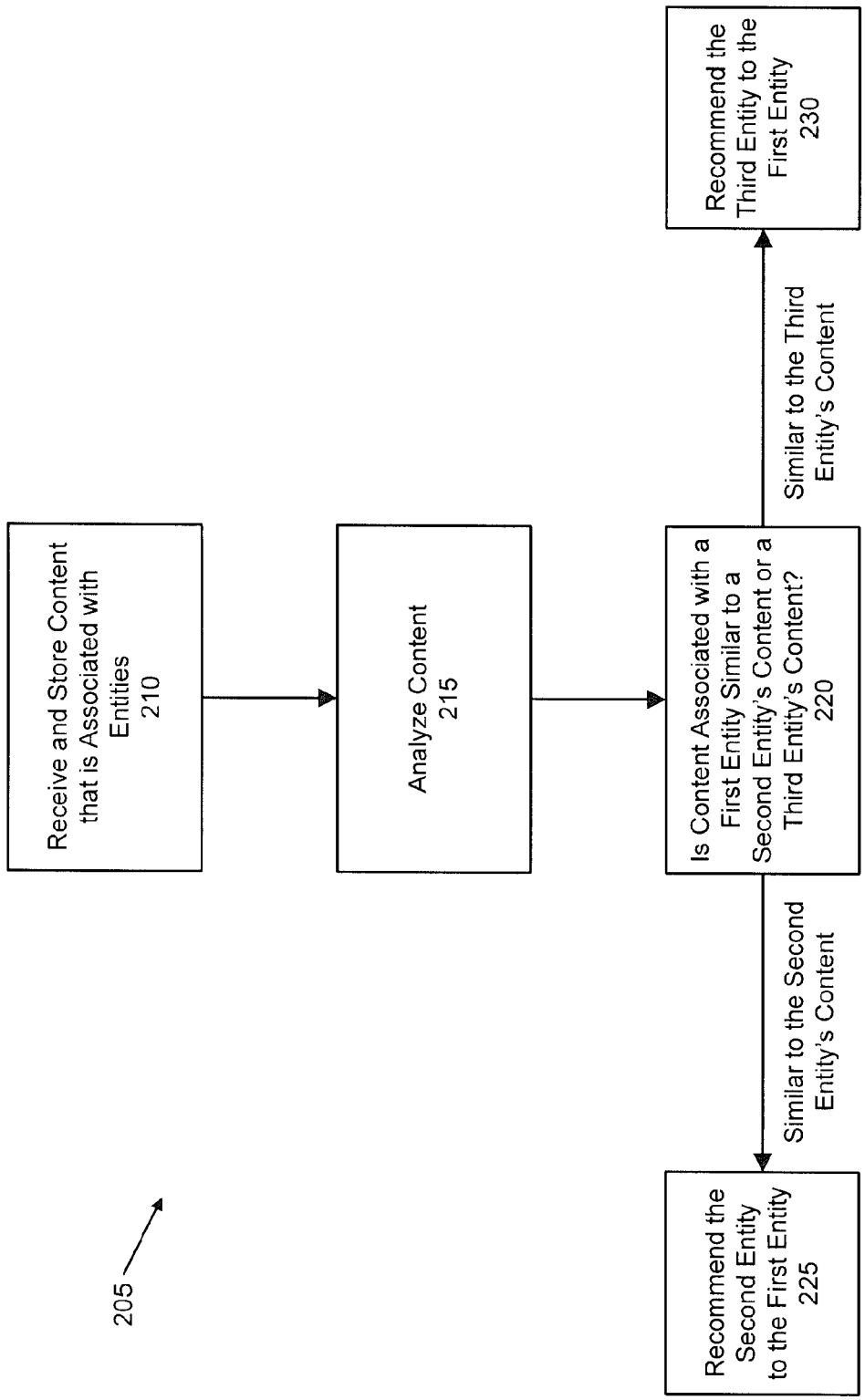
FIG. 2 is an operational flow diagram illustrating a high level overview of a technique for making content-based recommendations in an embodiment.

FIG. 2 shows a flow 205 for making content-based recommendations. Some specific flows are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In a step 210, content associated with the entities is received, such as at a server, and stored, such as in a database. The content can include information from an on-line profile page such as status updates and comments, feed content, social network feed content, profile feed content, blog entries, blog comments, news articles, editorials, reviews (e.g., product reviews, or restaurant reviews), discussion thread posts, files, e-mails, instant messages, text messages (e.g., SMS or Short Message Service text messages), Tweets (e.g., a post on Twitter®), acronyms, abbreviations, Internet slang, Internet short-hand, (e.g., "LOL," the abbreviation for "laughing out loud," "BFN," the abbreviation for "by for now"), or combinations of these.

In a specific implementation, the content includes words, such as words of a natural language used for communication among human beings. Such natural language can be spoken, written, or both. In this specific implementation, the content is received as free-form text which may be inputted by the user into a free-form text field of a webpage. The content can be in any language such as English, Hindi, Spanish, French, German, Chinese, Japanese, or Arabic. The content may include paragraphs, sentences, clauses, phrases, text, characters, symbols, punctuation marks, or combinations of these. The content may include leet, leetspeak, netspeak, or chatspeak. Leet is generally considered to be a type of slang or abbreviation that Internet users have popularized. Such terms have sometimes originated with the purpose of saving keystrokes. Some people use these abbreviations in texting, instant messaging, and on social networking websites. Leet uses various combinations of ASCII characters to replace Latinate letters. Typically, in leet speek, letters may be replaced by characters of similar appearance. For example, "leet" may be written as "l33t" or "1337." The content may instead or additionally include images, pictures, graphics, video, audio, sound, speech, or combinations of these.

Generally, the content is associated with an entity such as a user, group, file, or other object (e.g., report or dashboard). For example, an entity can be a user making status updates to a profile page belonging to the user or making comments on a profile page belonging to another user. In this case, the content associated with the user can be the status updates, the comments, or both. As another example, an entity can be a group having group profile page or comment page which includes posts from two or more users. In this case, the content associated with the group can include the posts from the two or more users. That is, the content associated with the group can include a first post from a first user of the group and a second post from a second user of the group, where the first and second users are different.

As another example, an entity can be a file, report, or dashboard object having associated content such as comments (e.g., questions or suggestions) about the file, report, or dashboard object. Examples of files include Microsoft Word®, PowerPoint®, and Excel® files. A report typically includes a set of predefined parameters and summary information of a particular group or project (e.g., partner sales, opportunity schedule report, and the like). A dashboard typically includes one or more graphical objects that represent key performance indicators of the company or a department, group, role, or individual. Some examples of graphical objects include charts (e.g., pie chart, bar chart), graphs, gauges, data grids, column charts, maps, bubble charts, motion charts, area charts, and the like.

The comments may be from two or more users. For example, the file can be a product price list (e.g., a Microsoft Excel® file) and the comments can be about the product price list. As an example, a first comment from a first user may be "The new pricelist covers all worldwide products for Fiscal Year 2011." A second comment from a second user may be "The big change is that the XR2000 now comes bundled with all of our product suites. It no longer needs to be an add-on." These comments may be stored in a location separate from the file, i.e., stored in a location separate from the file content itself. For example, the comments (i.e., content associated with the file) may be stored in a separate file or separate database. A file identifier can be used to associate the comments and file. The comments may be referred to as metadata that is associated with the actual Excel pricelist file. Thus, in a specific implementation, the system analyzes the comments associated with the entity (e.g., file), rather than the actual content of the file itself, in order to make recommendations. The actual content of the file is not analyzed or is excluded or is omitted from the analysis. In other words, a recommendation is made without analyzing the content of the actual Excel pricelist file. In another specific implementation, the actual content of the file is instead or additionally analyzed in order to make recommendations. The Excel pricelist file may be stored as a large object data type and the comments may be stored as a different data type such as a character data type.

In a specific implementation, the content associated with the entities is generated passively by the entities. That is, the entity is not generating content in direct response to a question about their interests in connection with their desire to receive recommendations. In another specific implementation, the entity is generating content in direct response to a question. For example, the system may explicitly prompt the user to write a brief paragraph about their interests so that the system can provide relevant recommendations to the user based upon their interests.

In a step 215, the content is analyzed so that the system can make recommendations based on the analyzed content. Generally, the analysis includes analyzing content associated with a first entity and analyzing content associated with a second entity to determine whether the second entity should be recommended or provided to the first entity.

For example, if a first entity is a user, content associated with the user that will be analyzed can include any items or collections of content generated, authored, submitted, adopted, uploaded, created, or published by the user, or otherwise associated with the user. The content associated with the user to be analyzed may be referred to as a "document." Thus, in this example, the term "document" may refer to the set of profile page posts by the user. The "document" may include all comments the user made or may be limited to a subset of comments the user made. The subset of comments can be comments that were made related to a specific context (e.g., group, report, dashboard, business object, file, webpage, or field), period of time, geographical location, or combinations of these.

In other words, the content to be analyzed can be specifically selected or filtered based on one or more parameters as appropriate. For example, to make a work-related recommendation, the system can analyze work-related content associated with the user and exclude from the analysis nonwork-related content. Specifically, a user's profile page can include a first field where the user enters nonwork-related interests such as hobbies and a second field where the user enters work-related interests such as technical papers the user has authored, industries that the user works in, geographical areas that the user is responsible for, and so forth. In some cases, it will be desirable for the system to make work- or business-related recommendations and not make nonwork-related recommendations. Thus, in these cases, the system can filter or select specific items of user-generated content, such as content in the second field, to analyze in making recommendations.

The second entity can be, for example, a group. The content to be analyzed to determine whether the group should be recommended to the user can be all posts on the group's profile page. Alternatively, the system can select a subset of the posts to be analyzed. For example, the system can select recent posts such as all posts within the last six months. The system can filter or select the groups to be analyzed using any parameter or combination of parameters. For example, the system can filter groups based on whether the group is work-related or nonwork-related, or the number of members in a group so that only groups having more or less than a threshold number of members is analyzed. Other examples of parameters include type or category such as business, entertainment, games, sports, politics, travel, art, music, and many others.

The results from the analysis can be stored on the system. As discussed, a specific implementation of the system analyzes the content using a probabilistic topic model. The output from the model, such as the topic distributions for the content associated with the first and second entities can be stored on the system's storage. The analysis may be performed on a rolling basis so that the topic distributions are continuously updated based on new content being received by the system. This helps to ensure timely and relevant recommendations. For example, the system may analyze the content on a daily or weekly basis and update the stored topic distributions as appropriate. Because the analysis may use a large amount of system resources, the analysis may be scheduled for off-peak hours such as on weekends or during the early morning hours in order to conserve system resources.

Alternatively, the analysis may be performed dynamically or triggered when new content is received or when a certain amount of new content is received. Thus, in an embodiment, a method includes upon detecting a threshold number of new posts made to a profile or comments page associated with an entity, recalculating a topic distribution for the entity. The threshold number can be any number (e.g., 1, 2, 3, 4, or 5) and may be set by a user such as an administrator. In a specific embodiment, the recalculated topic distribution replaces the previous topic distribution calculated for the group or entity. In another embodiment, the recalculated topic distribution does not replace the previous topic distribution. That is, the system stores both the recalculated and previous topic distribution. This allows, for example, performing a historical or trend analysis to determine how the topic distribution changed over a period of time.

In a specific implementation, in a step 220, the system determines whether content associated with the first entity is more similar to content associated with the second entity or content associated with a third entity. As discussed, in a specific implementation, topic distributions outputted from an LDA model and a Kullback-Leibler Diverence between the topic distributions are used to determine similarity between the content. If the content associated with the second entity is more similar, i.e., closer in relevance, than the content associated with the third entity, the system recommends or provides the second entity to the first entity (step 225). If, however, the content associated with the third entity is more similar than the content associated with the second entity, the system recommends or provides the third entity to the first entity (step 230).

In a specific implementation, the system provides both the second and third entities to the first entity and ranks or orders the second and third entities based on their relevance to the first entity. For example, if the system determines that content associated with the second entity is more similar than content associated with the third entity, the system can provide both the second and third entities, but list the entities so that the second entity is ranked higher than the third entity. As an example, the second entity may be displayed above the third entity. The system may instead or additionally use other visual indicators to indicate that the second entity is likely to be of more interest to the first entity than the third entity. For example, the second entity may be displayed using a different color than the third entity. Other examples of visual indicators include font sizes, font types, highlighting, icons, and the like.

Ranking or ordering the entities, however, is optional and is not included in some embodiments of the invention. Thus, in another specific implementation, a single entity (i.e., either the second entity or the third entity, but not both) is recommended to the first entity.

In a specific implementation, there is a threshold divergence value to determine whether an entity should be recommended to another entity. For example, if the divergence between a first topic distribution and a second topic distribution is too far apart, i.e., is greater than the threshold divergence value, then the system will not provide a recommendation. However, if the divergence is less than the threshold divergence value, then the system will provide the recommendation.

The threshold divergence value may be set by an administrator so that it is applied system-wide. Alternatively, the threshold divergence value may be set by an individual end-user and stored, for example, as user profile information on the server or client. For example, one user may desire recommendations only when there is a strong indication of similarity or relevance (e.g., a small divergence between the topic distributions). Another user may desire recommendations even if there is weak indication of similarity (e.g., a large divergence between the topic distributions).

In a specific implementation, the threshold divergence value is mapped to a color (e.g., green, orange, or red) so that the user can set the preferred threshold divergence value by selecting a specific color code rather than inputting an actual number. For example, the color green may be selected when the entity desires recommendations only when there is a high degree of similarity. The color red may be selected when the entity desires recommendations even if there is a low degree of similarity. In another specific implementation, an entity inputs or selects an actual number (e.g., 1, 2, or 3) to indicate the preferred threshold divergence value. It should be appreciated, however, that the threshold divergence value ranges may be represented using other indicators such as letters, icons, or other graphical controls such as slider bar. In other words, the system can provide the user or administrator with any form of threshold to choose, which could be pure numbers or some "color codes" (e.g., green orange, red—to indicate the degree of similarity). The invention is not limited to which form of thresholding is used.

Figure 3:
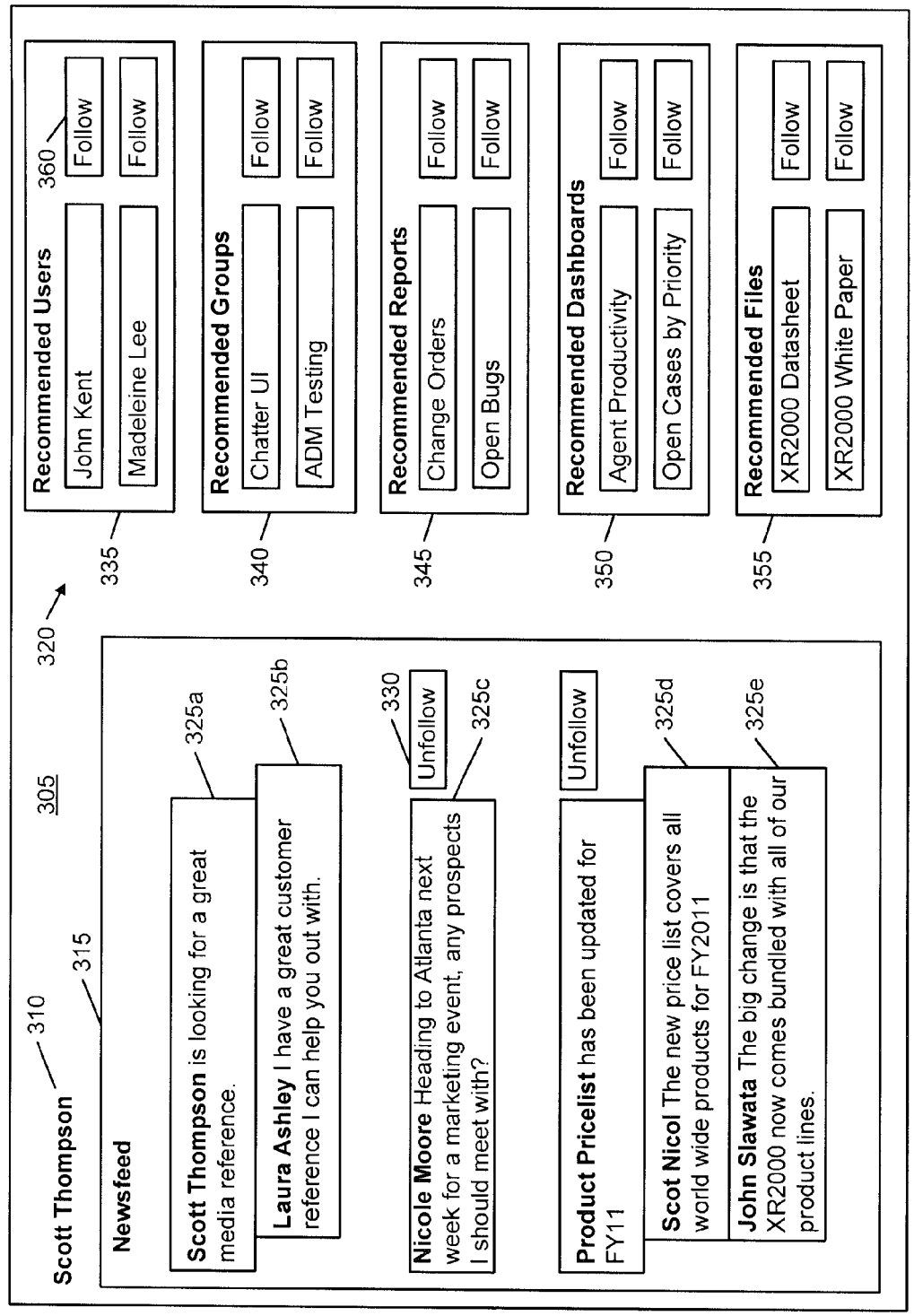
FIG. 3 illustrates an example of a webpage where a user is provided with content-based recommendations in an embodiment.

FIG. 3 shows an example of a webpage 305 with recommendations that is displayed within a browser. This webpage may be referred as a home page or profile page. This example of the home page belongs to an entity or user 310 "Scott Thompson." The page may include various news, contact information, job title, a brief introduction about the user, a photo of the user, and so forth. This page includes a newsfeed region 315 and a recommendation region 320.

The newsfeed region includes one or more newsfeed items or content. A newsfeed item may be referred to as a feed or post. In this example, the newsfeed includes newsfeed items 325a, 325b, 325c, 325d, and 325e. The newsfeed items are associated with entities. For example, newsfeed item 325a ("looking for a great media reference") is associated with user "Scott Thompson." Newsfeed item 325b is associated with a user "Laura Ashley" who has posted the response, "I have a great customer reference I can help you out with."

Newsfeed item 325c is associated with a user "Nicole Moore" who user "Scott Thompson" is "following." "Following" refers to subscribing to another entity's posts, comments, or status updates. "Following" or subscribing allows user Scott to keep up and stay on top of things that are important. That is, the user can stay abreast of what their colleagues are doing and on the status of important projects and deals. In this example, user "Nicole Moore" has posted the status update "Heading to Atlanta next week for a marketing event, any prospects I should meet with?" on her home page. Her status update appears on Scott's home page because Scott is "following" her. User Scott may decide to "unfollow" her (i.e., not receive any further status updates) by clicking an unfollow button 330. Newsfeed items 325d and 325e are associated with users "Scot Nicol" and "John Slawata," respectively, which in turn are associated with a file "Product Pricelist." Again, if user Scott is no longer interested in updates to the "Product Pricelist," the user can click an "unfollow" button and the user will not receive any further updates regarding the file.

The recommendation region includes sections for recommended users 335, recommended groups 340, recommended reports 345, recommended dashboards 350, and recommended files 355.

The recommendations section includes one or more entities (e.g., a list of entities), such as users, groups, reports, dashboards, or files that the system has determined user 310 "Scott Thompson" might be interested in based on content associated with user 310 and content associated with the other users, groups, reports, dashboard, or files. For example, based on posts made by user 310, such as "looking for a great media reference" and other posts, the system can search or locate other users that user 310 may be interested in following because of the posts made by these other users. Specifically, first recommended user "John Kent" may have made posts related to the media (e.g., television, newspapers, and magazines). If user 310 is interested in "following" the first recommended user, user 310 can click a follow button 360. Then, user 310 will receive in the newsfeed region of the home page, status updates or other posts published by the first recommended user.

This example of the recommended users section further includes a second recommended user "Madeleine Lee." Again, in this example, the system has determined that based on the similarities in content associated with user 310 and the second recommended user, user 310 may be interested in "following" the second recommended user. In a specific implementation, the recommendations are rank ordered or prioritized with respect to their relevance. In this example, the system has determined that the first recommended user is more relevant to user 310 than the second recommended user. So, the first recommended user is displayed above the second recommended user. It should be appreciated, however, that recommendations may instead be listed or sorted using other criteria or attributes. Some examples of other types of sorts include alphabetical, chronological, and reverse chronological.

It should be appreciated that the page layout shown in the figure is merely exemplary. One of skill in the art would recognize that there can be other page layouts that are different from what is shown. For example, although this page layout includes five recommendation sections, there can be any number of sections such as fewer than five or more than five. As further examples of other page layouts, there can be a recommendations tab, a floating recommendations window, a combined recommendations section (e.g., a single section having both recommended users and groups), and so forth. A recommendations section can include any number of recommendations (e.g., one, two, three, four, five, or more than five recommendations). The number of recommendations shown in a recommendations section can be set or configured by a user. Furthermore, in other embodiments, recommendations may be provided to the user using other techniques or a combination of techniques. For example, user 310 may be sent an e-mail, text message, or both which includes the recommendations.

Figure 4:
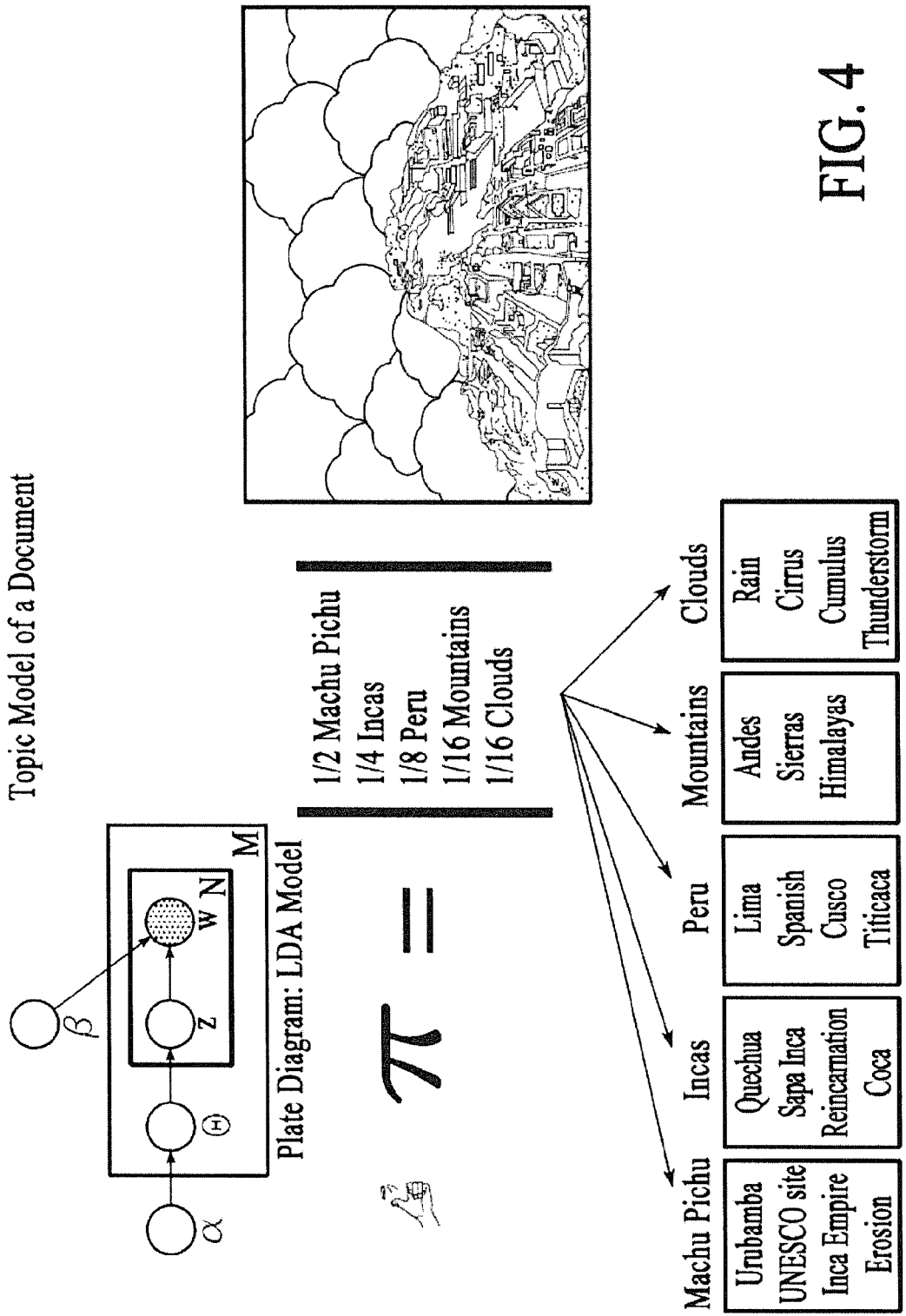
FIG. 4 illustrates an LDA topic model of a corpus in an embodiment.
Figure 5:
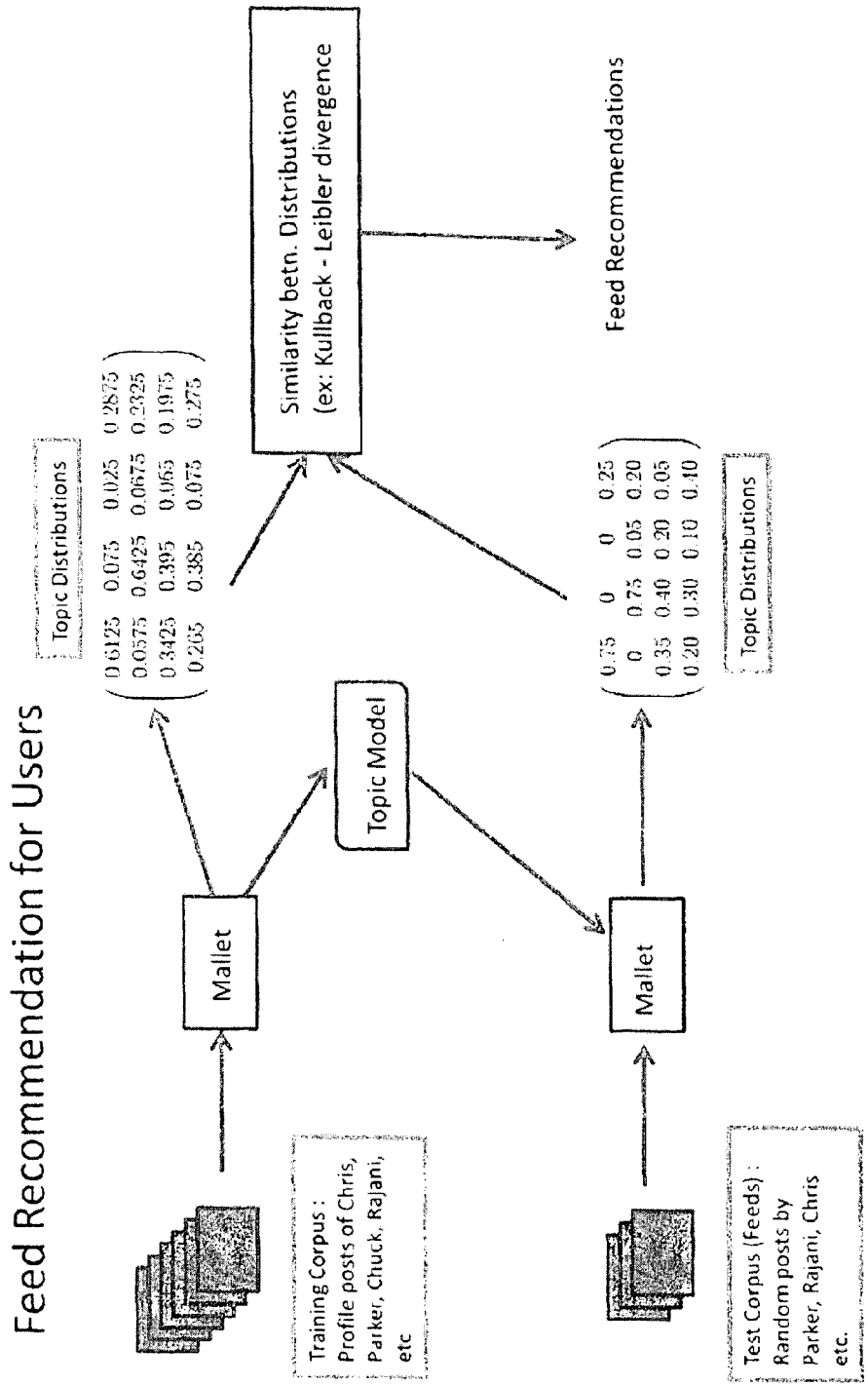
FIG. 5 illustrates a graphical representation of training the model and making feed recommendations for users.

FIGS. 4-5 show graphical representations of the LDA model. Specifically, FIG. 4 shows the topic model of a corpus. FIG. 5 shows a graphical representation of training the model and making feed recommendations for users. In a specific implementation, systems and techniques are provided to make recommendations, filtering of feeds, or both based on topics of interest to an entity which can be a group, user, or essentially any topic of interest to any entity. The topics are latent and are inferred. In another specific implementation, the systems and techniques are provided for search augmentation by disambiguating search queries (e.g., does the word "plant" refer to the biological entity, the verb, or to a chemical plant?). The system can be used to complement collaborative filtering (CF) based recommendations. The system may operate unsupervised. A computer-implemented or computer-executable version of the invention may be provided as a computer software product that is written in any of various programming languages. In a specific implementation, the programming languages include MALLET and Python. MALLET is a Java "Machine Learning for Language Toolkit." MALLET includes an integrated collection of Java code that can be useful for statistical natural language processing, document classification, cluster analysis, information extraction, and other machine learning applications.

In a specific implementation, a technique trains a topic model similar to the Latent Dirichlet Allocation ("LDA") methods based on the news feed posts by an entity, which may include users posting on their profile pages, as well as posts published to a collaboration group page. A distribution of topics is "learned" for the entity.

In an embodiment, when a new feed (or post if by a user) is presented to a probabilistic topic model ("the model"), it infers the most relevant user and/or group for the feed (or post). Alternatively or additionally, the model returns a ranked list of the relevant users and/or groups based on the topic distribution of the new feed(s). The model may provide recommendations based upon single posts, collections of posts, whole feeds, or the like.

As used herein, if the entity is a user, then the term, "document," may refer to the set of all profile page posts by the user. If the entity is a group, then the term, "document," may refer to the set of all posts on the group's profile page.

In an embodiment, after analyzing the distribution of topics posted by an entity, the model may recommend a relevant collection of users, e.g., a collection of users that the model recognizes as sharing similar interests based upon newsfeed posts. If the entity is a group, then the model may also recommend one or more relevant groups based on what has been posted by group members. As a result of analyzing posts by an entity, the model may also be used to improve search results ("search augmentation"), since the model may be able to disambiguate search queries, e.g., whether the term, "plant," refers to a biological entity, a verb, or a chemical plant.

In an embodiment, the model is "generative," in that it assumes that every document consists of a mixture of topics. Each topic may contain a mixture of words in different distributions. For example, a user could post information on his profile page that relates to topics such as ADM/Scrum, Build Issues, Chatter Architecture, TechCrunch updates, and the like. Each of these topics may have a different distribution of words. For example, the ADM/Scrum topic is more likely to include terms such as, "Agile," "story point," etc., and may be less likely to include terms such as "VMware," "Zynga," or "Twitter" (which are more likely to be related to the TechCrunch updates topic).

Using the above-described information, the model may assume each user's profile page is generated according to the following steps:

1. Choose a distribution of "K" topics in random, for a given user.
2. To generate each word in a user's profile page, choose a topic at random from the current distribution of topics for the user.
3. Given the chosen topic in step 2, choose a word at random from the distribution of words under that topic (and a small "prior," which gives the distribution of words, irrespective of any topic).
4. Repeat steps 2 and 3 until all the words in the document are generated.

In an embodiment, the model attempts to invert the above generative process in order to infer any hidden topics in the document given a sequence of words.

Since the topics are assumed to be hidden, in a specific embodiment, the model does not initially declare the list of topics to which a document may correspond. The model may only declare the total number of topics that a document can comprise. By looking at the inferred list of topics (essentially a collection of words for each hidden topic) for each document, the model may identify the context of the topic.

In an embodiment, the model outputs that a first user (User A) has a topic distribution of the form=[0.2, 0.3, 0.1, 0.1, 0.2, 0.1] (assuming a document contains 6 topics); Feed Item B has a topic distribution of the form=[0.1, 0.1, 0.3, 0.2, 0.2, 0.1); and Feed Item C has a topic distribution of the form= [0.2, 0.2, 0.1, 0.3, 0.1, 0.1].

An algorithm applied by the model may suggest that Feed Item C is likely to be of more interest to User A than Feed Item B, because the topic distribution of Feed Item C [0.2, 0.2, 0.1, 0.3, 0.1, 0.1], is "closer in relevance" to the topic distribution of User A [0.2, 0.3, 0.1, 0.1, 0.2, 0.1], than Feed Item B [0.1, 0.1, 0.3, 0.2, 0.2, 0.1]. (In this specific implementation, this is measured in terms of the Kullback-Leibler Divergence between the two distributions:

$$KL\ DIV(A\|B)=Sum\_i\{A(i)*\log(A(i)/B(i)\}$$

The model may apply a similar approach to determine which two users are closer in relevance to each other, and/or which two groups are closer in relevance to each other, etc., by comparing the divergence of their "topic distributions."

In a specific implementation, the technique only considers "User Posts" and "Group Posts,", and does not consider "clickstream" data or the organizational role of the posting entity. However, one skilled in the art will appreciate that the model can be configured to consider some or all posts relevant to an entity, the organizational role of an entity, the reporting hierarchy of the entity, an entity's existing connections to other entities, and the like. The examples given herein are not intended to limit this disclosure to any particular embodiment.

FIG. 6 illustrates a block diagram of an environment 610 wherein an on-demand database service implementing an embodiment of a content-based recommendation system might be used. Environment 10 may include user systems 612, network 614, system 616, processor system 617, application platform 18, network interface 620, tenant data storage 622, system data storage 624, program code 626, and process space 628. In other embodiments, environment 10 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application (s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $1000_1$-$1000_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 1000 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
  calculating a plurality of topic distributions of content associated with a plurality of entities;
  comparing a first topic distribution based on content associated with a first entity with a second topic distribution based on content associated with a second entity to determine a first divergence between the first topic distribution and the second topic distribution;
  comparing the first topic distribution with a third topic distribution based on content associated with a third entity to determine a second divergence between the first topic distribution and the third topic distribution;
  if the first divergence is less than the second divergence, displaying an indication of the second entity on a webpage profile of the first entity to permit the first entity to follow the second entity; and
  if the second divergence is less than the first divergence, displaying an indication of the third entity on the webpage profile of the first entity to permit the first entity to follow the third entity.

2. The method of claim 1, wherein the content comprises words.

3. The method of claim 1, wherein the first entity comprises a first user and the second entity comprises a second user.

4. The method of claim 1, wherein the first entity comprises a first user, the second entity comprises a group, and the content associated with the second entity comprises a first comment made by a first member of the group and a second comment made by a second member of the group.

5. The method of claim 1, wherein the if the first divergence is less than the second divergence, displaying an indication of the second entity further comprises displaying an indication of the third entity on the webpage profile of the first entity to permit the first entity to follow the third entity, wherein the third entity is displayed on the webpage profile below the displayed indication of the second entity.

6. A machine-readable medium carrying one or more sequences of instructions, which instructuins, when executed by one or more processors, cause the one or more processors to carry out the steps of:
  calculating a plurality of topic distributions of content associated with a plurality of entities;
  comparing a first topic distribution based on content associated with a first entity with a second topic distribution based on content associated with a second entity to determine a first divergence between the first topic distribution and the second topic distribution;
  comparing the first topic distribution with a third topic distribution based on content associated with a third entity to determine a second divergence between the first topic distribution and the third topic distribution;
  if the first divergence is less than the second divergence, displaying an indication of the second entity on a webpage profile of the first entity to permit the first entity to follow the second entity; and
  if the second divergence is less than the first divergence, displaying an indication of the third entity on the webpage profile of the first entity to permit the first entity to follow the third entity.

7. The machine-readable medium of claim 6, wherein the content comprises words.

8. The machine-readable medium of claim 6, wherein the first entity comprises a first user and the second entity comprises a second user.

9. The machine-readable medium of claim 6, wherein the first entity comprises a first user, the second entity comprises a group, and the content associated with the second entity comprises a first comment made by a first member of the group and a second comment made by a second member of the group.

10. The machine-readable medium of claim 6, wherein the if the first divergence is less than the second divergence, displaying an indication of the second entity further comprises displaying an indication of the third entity on the webpage profile of the first entity to permit the first entity to follow the third entity, wherein the third entity is displayed on the webpage profile below the displayed indication of the second entity.

11. An apparatus comprising:
  a processor; and
  one or more stored sequence of instructions which, when executed by the processor, cause the processor to carry out the steps of:
  calculating a plurality of topic distributions of content associated with a plurality of entities;
  comparing a first topic distribution based on content associated with a first entity with a second topic distribution based on content associated with a second entity to determine a first divergence between the first topic distribution and the second topic distribution;
  comparing the first topic distribution with a third topic distribution based on content associated with a third entity to determine a second divergence between the first topic distribution and the third topic distribution;
  if the first divergence is less than the second divergence, displaying an indication of the second entity on a webpage profile of the first entity to permit the first entity to follow the second entity; and
  if the second divergence is less than the first divergence, displaying an indication of the third entity on the webpage profile of the first entity to permit the first entity to follow the third entity.

12. The apparatus of claim 11, wherein the content comprises words.

13. The apparatus of claim 11, wherein the first entity comprises a first user and the second entity comprises a second user.

14. The apparatus of claim 11, wherein the first entity comprises a first user, the second entity comprises a group, and the content associated with the second entity comprises a first comment made by a first member of the group and a second comment made by a second member of the group.

15. The apparatus of claim 11, wherein the if the first divergence is less than the second divergence, displaying an indication of the second entity further comprises displaying an indication of the third entity on the webpage profile of the first entity to permit the first entity to follow the third entity, wherein the third entity is displayed on the webpage profile below the displayed indication of the second entity.

16. A method for transmitting code comprising:
    transmitting code to calculate a plurality of topic distributions of content associated with a plurality of entities;
    transmitting code to compare a first topic distribution based on content associated with a first entity with a second topic distribution based on content associated with a second entity to determine a first divergence between the first topic distribution and the second topic distribution;
    transmitting code to compare the first topic distribution with a third topic distribution based on content associated with a third entity to determine a second divergence between the first topic distribution and the third topic distribution;
    if the first divergence is less than the second divergence, transmitting code to display an indication of the second entity on a webpage profile of the first entity to permit the first entity to follow the second entity; and
    if the second divergence is less than the first divergence, transmitting code to display an indication of the third entity on the webpage profile of the first entity to permit the first entity to follow the third entity.

17. The method of claim 16, wherein the content comprises words.

18. The method of claim 16, wherein the first entity comprises a first user and the second entity comprises a second user.

19. The method of claim 16, wherein the first entity comprises a first user, the second entity comprises a group, and the content associated with the second entity comprises a first comment made by a first member of the group and a second comment made by a second member of the group.

20. The method of claim 16, wherein the if the first divergence is less than the second divergence, transmitting code to display an indication of the second entity further comprises transmitting code to display an indication of the third entity on the webpage profile of the first entity to permit the first entity to follow the third entity, wherein the third entity is displayed on the webpage profile below the displayed indication of the second entity.

\* \* \* \* \*